P. P. STEWART.

Cooking Stove.

No. 1,673.

Reissued May 17, 1864.

Cross Section at A. a.

Witnesses.

Chas. D. Kellum

Marcus P. Norton

Inventor.

Philo P. Stewart

N. PETERS, Photo-Lithographer, Washington, D. C

UNITED STATES PATENT OFFICE.

PHILO P. STEWART, OF TROY, NEW YOKK.

IMPROVEMENT IN COOKING-STOVES.

Specification forming part of Letters Patent No. 23,622, dated April 12, 1859; Reissue No. 1,673, dated May 17, 1864.

*To all whom it may concern:*

Be it known that I, PHILO P. STEWART, of the city of Troy, county of Rensselaer, State of New York, have invented new and useful Improvements in Cooking-Stoves, for which Letters Patent of the United States were granted to me on the 12th day of April, 1859; and I do hereby declare that the following is a full, clear, and exact description of the construction and operation of the same, reference being hereby had to the accompanying drawings, and to the letters of reference marked thereon, and a part hereof.

Like letters represent and refer to like or corresponding parts.

Figure 2:
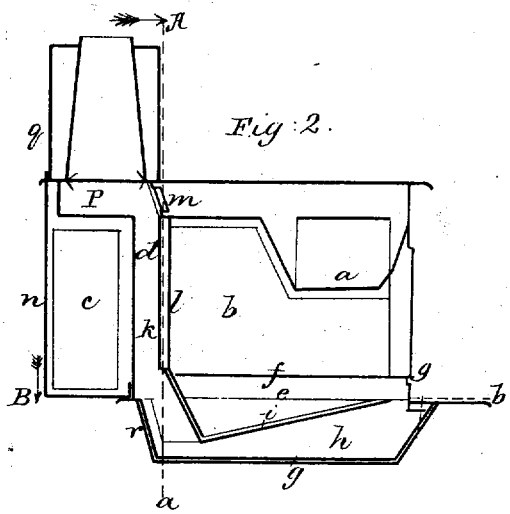
Figure 3:
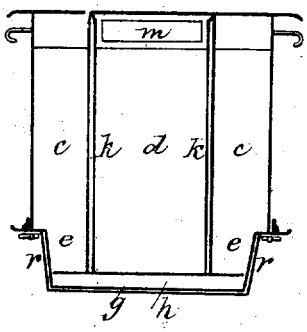
Figure 5:
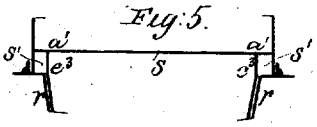
Figure 4:
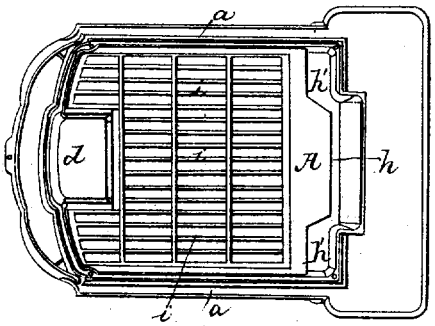
Figure 1:
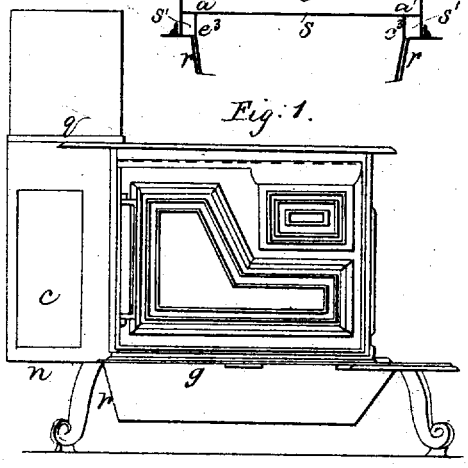

Figure 1 is a side elevation of the stove. Fig. 2 is a longitudinal vertical section. Fig. 3 is a cross-vertical section taken at line A *a* of Fig. 2, and Fig. 4 is a horizontal section taken at the line B *b* of Fig. 2. Fig. 5 shows the side air-chambers.

My improvements relate to what is known as the return-flue stove, in which the fire-chamber is placed in front of the oven, and the products of combustion or heated air pass in a sheet between the top boiler-plate of the stove and the top of the oven, and, dividing, pass down two side flues at the back, thence in a single sheet under the oven, around the front end of the flue-plate, back between this plate and the bottom plate of the oven, and up to the exit-pipe through a rising flue at the back of the oven and between the two descending flues, there being a passage directly from the top flue over the upper end of the back rising flue, and controlled by a damper for the purpose of discharging the products of combustion or heated air directly to the chimney when it may be desired not to heat the oven sufficient for baking purposes or to hasten combustion of the fuel.

I have found by repeated experiments in cooking-stoves that the heat imparted to the back rising flue connected to the exit-pipe leading to the chimney is somewhat wasted by being carried out directly into the chimney, and this is also partly true in relation to the return-flue at the bottom. I have also found that there is great inequality in the heating of the sides of the oven, and that the back and bottom receive less heat than the front and top. To remedy these defects or evils by retaining and equally distributing the heat to all parts of the oven, whereby there shall be no considerable waste or inequality in the distribution of the heat for baking or cooking purposes, is the main or leading object of my improvements herein described and set forth.

In the accompanying drawings, *a* represents the fire-chamber in front of the stove, and *b* the oven, the rear part of which is back of the fire-chamber and the front part extending under the fire-chamber, so that the front part of this oven receives heat from the back and from the bottom of the fire-chamber. At the back of the oven there are three vertical flues side by side. The side flues, *c c*, are diving-flues, and the one in the middle, *d*, is a rising flue leading to the exit-pipe. The heat or non-consumed products of combustion pass directly from the fire-chamber in a single sheet over the top of the oven, and, dividing, descend through the two flues *c c* at the back, and at the bottom unite in a single sheet in the flue-space *e*, which extends the whole length of the bottom of the oven. The space between the bottom plate, *f*, of the oven and the bottom plate, *g*, of the stove is divided by the incline plate *i*, which forms the direct flue *e* and the return-flue *h*. This incline plate *i* is somewhat higher at the front end than at the rear end, so that the capacity of the flue-space *e* may be gradually reduced toward the front end of the oven, thereby concentrating the action of the heat or unconsumed products of combustion against the bottom of the oven, as the same are somewhat reduced in the degree of heat in their passage from the fire-chamber thereto. The upper surface of this inclined plate is cast with flanges so as to form dovetail recesses to hold any suitable kind of earthy cement, which is to be plastered over the entire upper surface to act as a non-conductor, and to prevent the heat from passing through the said plate to the return-flue *h*, just below, and thereby retain the same for directly heating the bottom plate of the oven just above. The front end of this inclined plate *i* does not extend entirely to the front plate, *j*, of the stove, Fig. 2. The center portion of this plate at the front end thereof extends forward toward the said stove-plate *j*, as seen at A, Fig. 4, and thereby forms a recess, *h'*, upon each side or front corner of the said inclined plate *i*, as seen at said Fig. 4. This projection of the said inclined plate, as shown at A, Fig. 4, is for the purpose of carrying the heat as near the front edge of the oven-bottom as possible before it enters the lower or return flue, *h*. The recess *h'* at each front corner of the said incline plate *i* is for the purpose of forcing the heated current toward and near the outer edges of the oven-plate *f*, so as to aid in equalizing the degree of heat in said plate to all parts thereof. The draft is stronger through such spaces *h'* than at the space *h*, for the reason that such spaces are of greater capacity than the space *h*, and much nearer the center upright draft-flue *d*, leading to the exit-pipe.

The partitions *k k*, which separate the two descending flues *c c* from the rising flue between them, are made double with a space between, which may be filled with cement or other non-conducting substance, to prevent the heat in the flues *c c* from passing through to the said rising flue and thereby be wasted, or prevented from being conducted by the draft under the bottom of the oven. The back oven-plate directly opposite the said rising flue *d* is also made double, as at *l*, Fig. 2, with a space between, which may be also filled with cement or other non-conducting material, so that the heat applied to this plate by the heated current passing the descending flues *c c*, and which is also applied thereto from the oven, shall not pass through the said rising flue, and thereby be wasted, but retained in the said oven and oven-plates for baking and cooking purposes.

There is a space or air-chamber, *s'*, upon each side of the stove, directly under the bottom plate of the oven and at the outer edge thereof. This chamber may be seen at *s'*, Fig. 5, and is formed by flanges or downward-projecting ribs cast upon the under side of the oven-bottom plate which extend downward sufficient to rest, or nearly so, upon that part of the stove plate directly below. This chamber or space may be of any capacity required. It extends the entire length of the stove upon each edge of the under side of the said oven-plate, and also extends upward on the back plate of the oven along the edge thereof, in the manner and for the purpose as above described as under the bottom plate, and is formed in the same manner and by the same means. It may also extend across the front end of the oven. The flange or downward projections *a' a'*, Fig. 5, may also be cast upon that plate of the stove directly below the said chambers *s' s'*, or it may be made separate and placed between the oven-bottom plate and the stove-plate just below. This space or chamber will permit the said oven-bottom plate to be more evenly heated than by any other means, for it will prevent the cold air outside of the stove from acting upon the stove plate and thereby upon the heat inside or underneath the oven, and also prevent the said heat from passing through said outside stove-plate and thereby be wasted. It will therefore be seen that the said oven-bottom plate will be more evenly heated over its entire surface, and that its outer edges will not become cooled to any considerable extent by the action of the cold or outer air, and that heat will pass to and be retained in the said edges of the bottom plate more evenly than has heretofore been accomplished, and thus uniform heat is imparted to the various parts of the oven without any waste of the heat, it being retained and used as herein described, and with less consumption of the fuel than otherwise, while baking is done more evenly. The top flue above the oven at the back end communicates directly with the upper end of the rising flue *d* by an aperture controlled by the damper *m*, which when closed directs the draft around the oven *b*, in the manner herein described, and to prevent the heat from wasting by passing through this damper to the rising flue when the said aperture is closed, I make the said damper double and fill it with cement or other non-conducting material.

The said inclined plate *i*, which forms the direct-flue space *e*, and the return-flue, as aforesaid, will cause the heat to remain for a long time under the bottom of the oven, for while it forces the heat upward against the oven-plate, it at the same time prevents its too rapid passage over the front end thereof into the flue below, which will also prevent the too rapid passage of the heat into the rising flue *d*, by reason of the rear end of said plate being lower than at the front end thereof. The heat above the said incline plate is always somewhat stronger than below the same. It will therefore be seen that by the incline of the said plate *i* the heat may be longer retained underneath the oven than were the said plate parallel with the oven-bottom plate and with the bottom plate of the stove; and by covering the same with some non-conducting material, as aforesaid, there will be no waste of heat, but the same will be nearly equally distributed over the entire surface of the oven-bottom plate, whereby the same is more equally or evenly heated.

*r*, Figs. 1, 2, 3, and 5, is an additional bottom or casing of tin or other suitable material, which incases the entire bottom of the stove so as to retain the heat within the sheet-flue space for baking or cooking purposes, as well as to prevent its escape into the room when the stove is used during warm weather. This casing or additional bottom may be made of any shape or form to fit the bottom of the stove when used, and may there be secured by any convenient mechanical device or contrivance which will answer the purpose of holding the same directly under the said sheet-flue space under the said oven, and may be removed at pleasure.

In the substantial manner and by the means above described, I am enabled not only more perfectly to equalize the heat around the oven and to every part thereof, but to accomplish this important result with much less fuel than by any other plan known to me.

Having thus described my invention and improvements in cooking-stoves, what I claim, and desire to secure by Letters Patent, is—

1. The method or means, substantially as described, of preventing heat from passing through to the rising flue leading to the chimney by separating it from the back oven-plate and from the descending flues by non-conducting partitions, or the equivalents therefor, and for the purposes herein set forth.

2. The employment of a double damper filled in with cement or other equivalent non-conducting material, in combination with the flue above the oven and with the rising flue leading to the chimney, substantially as and for the purposes herein described and set forth.

3. Separating the direct sheet-flue under the oven from the return sheet-flue below by means of a plate constructed substantially as and for the purposes herein described and set forth.

4. The dividing of the space between the bottom plate of the oven and the bottom plate of the stove by means of the inclined plate *i*, in the manner and for the purposes substantially as herein described and set forth.

5. The employment of the space or chamber *s'* in combination with the outer edge of the oven-bottom plate and with the back end oven-plate, in the manner substantially as and for the purposes herein described and set forth.

6. The sheet-flue division-plate *i*, having a recess, *h'*, at each front corner thereof, and the front projection, A, between such recesses, substantially as and for the purposes herein described and set forth.

7. The additional bottom plate or incasement device *r* in combination with the broad sheet-flue *h*, in the manner and for the purposes substantially as herein described and set forth.

In testimony whereof I have, on the 23d day of January, 1864, hereunto set my hand.

PHILO P. STEWART.

Witnesses:
CHAS. D. KELLUM,
MARCUS P. NORTON.